Aug. 2, 1960 W. F. BILLINGSLEY 2,947,339
TIRE CONSTRUCTION
Filed March 7, 1958 3 Sheets-Sheet 1

INVENTOR.
WILLIAM F. BILLINGSLEY
BY W. A. Shira, Jr.
ATTY.

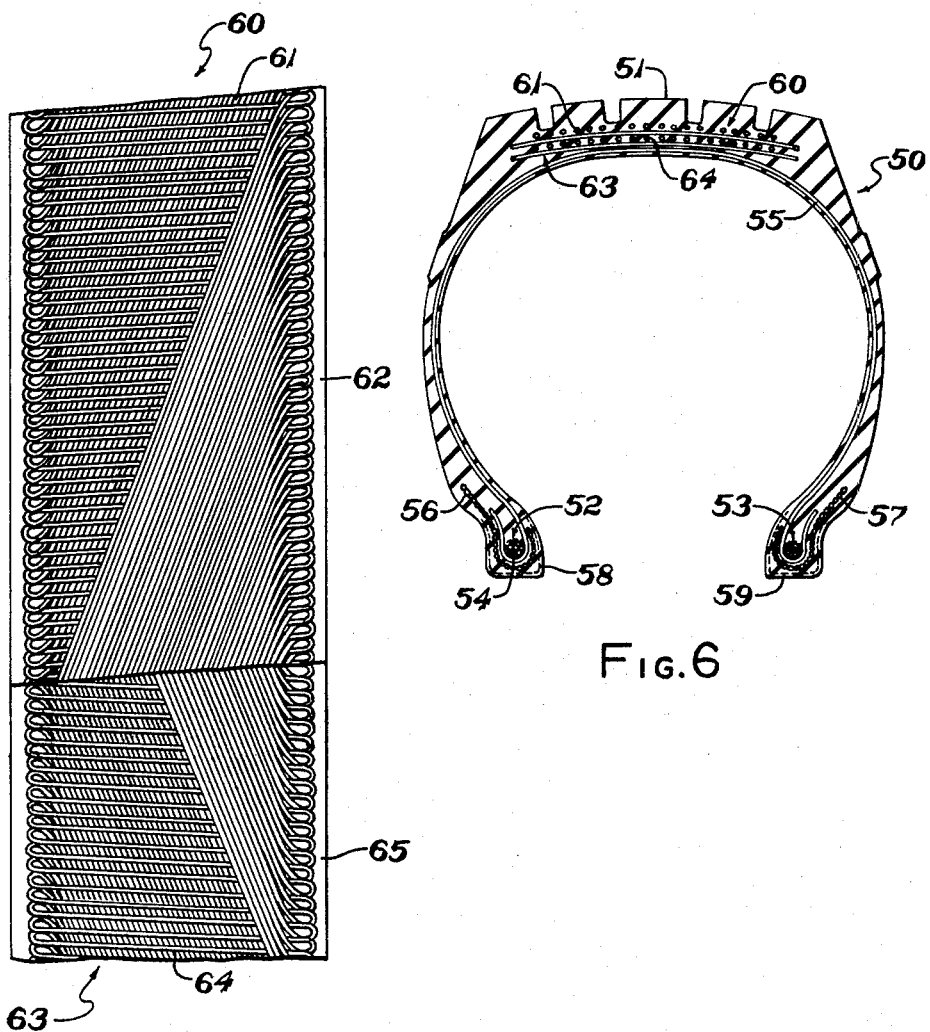

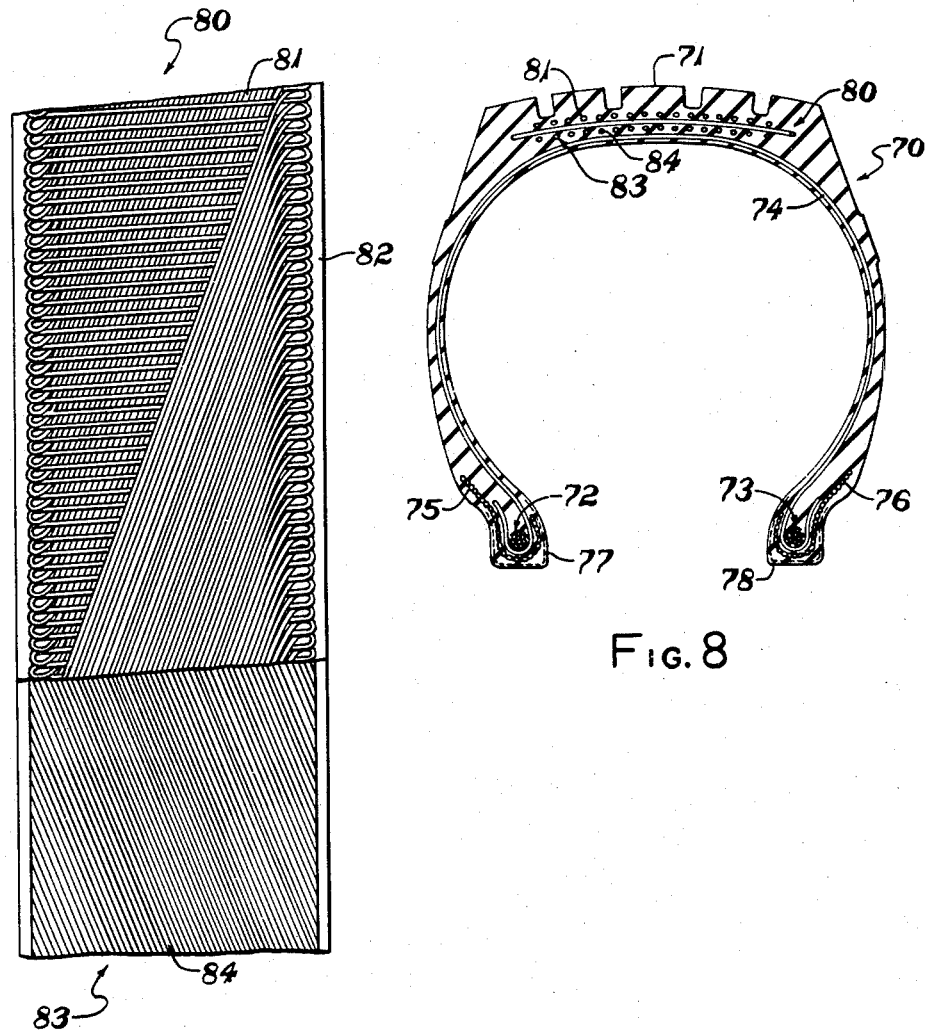

United States Patent Office 2,947,339
Patented Aug. 2, 1960

2,947,339

TIRE CONSTRUCTION

William F. Billingsley, Silver Lake, Ohio, assignor to The B. F. Goodrich Company, New York, N.Y., a corporation of New York Filed Mar. 7, 1958, Ser. No. 719,887

12 Claims. (Cl. 152—361)

This invention relates to vehicle tires of the inflatable type and, more particularly, to improvements in the construction of such tires which increases their load-carrying and tread wearing characteristics.

The tread of an inflatable vehicle tire is subjected to repeated deformation in the form of alternate contraction and expansion as it passes to and from contact with the surface of the roadway during rotation. This deformation produces what is known as a "scrubbing action" upon the roadway and accounts for a considerable proportion of the wear of the tread. It is now known that the scrubbing action of a tire tread can be lessened, the rate of tread wear materially reduced, and cornering improved by providing the tire with an inextensible but flexible band or belt between the carcass and tread portions in the location occupied by the conventional overhead. Many materials and constructions which provide suitable inextensibility for such bands or overheads are not, however, satisfactory because of insufficient flexibility, poor adhesion to the other components of the tire, or other difficulties.

It is, therefore, an object of this invention to provide an improved overhead for use in an inflatable vehicle tire characterized by substantial inextensibility in the direction of its length, flexibility insuring proper action in a tire, and good adhesion to the elastomer of the tire.

Another object of the invention is to provide an improved vehicle tire characterized by the presence of an overhead formed of substantially inextensible cord extending transversely relatively to the longitudinal center line of the tire in successive oppositely directed reaches with closed loops at each change of direction of the cord so that the overhead is flexible yet substantially inextensible and effectively interlocked with rubber of the carcass and tread.

A further object of the invention is to provide an improved vehicle tire characterized by having an overhead comprising a continuous wire cord disposed in zigzag configuration and in multiple convolutions with closed, overlapping loops at each change of direction and with successive convolutions having adjacent portions extending substantially parallel, whereby the overhead is in the form of a plural layer annular band with the several cord portions in overlapping interlocking relationship which resists extension lengthwise of the band while permitting flexibility thereof.

A still further object of the invention is to provide a vehicle tire as defined above wherein tread extensibility in a lateral direction is further reduced by the addition of a layer of parallel cords extending transversely of the longitudinal center line of the overhead.

It is also an object of the invention to provide an improved inflatable vehicle tire construction wherein tread wear is reduced and cornering improved by the incorporation of an improved overhead as defined in the preceding paragraphs and wherein the flex characteristics of the tire are improved by employing a carcass of radially disposed reinforcing metallic or textile cords.

An additional object of the invention is to provide an improved tire construction which employs less material than conventional textile cord reinforced tires yet provides equal or greater strength, better tread wear, better cornering action, and permits inflation to higher pressures providing higher load-carrying capacity without loss of cushioning characteristics.

Further objects and advantages of the invention will be apparent to those skilled in the art to which it pertains from the following description of the presently preferred embodiment, and certain modifications, described with reference to the accompanying drawings forming a part of this application and in which:

Fig. 6 is a view similar to Figs. 1 and 4 showing a different embodiment of the invention;

Fig. 7 is a view similar to Fig. 3 showing a portion of the inextensible band or overhead employed in the tire illustrated in Fig. 6, a part of the band or overhead being broken away to more clearly reveal the construction;

Fig. 8 is a view similar to Figs. 1, 4 and 6 showing a still different embodiment of the invention; and Fig. 9 is a view similar to Figs. 3 and 7 showing a portion of the inextensible band or overhead employed in the tire illustrated in Fig. 8, a part of the band or overhead being broken away to more clearly reveal the construction.

Figure 1:
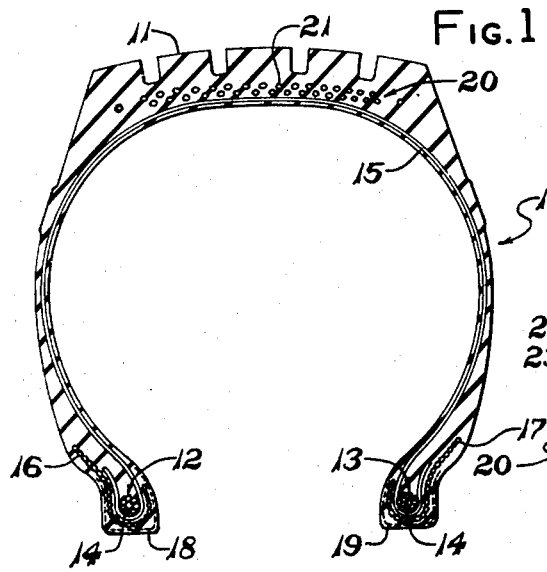
Fig. 1 is a transverse sectional view through a portion of a tire constructed in accordance with this invention.

An inflatable vehicle tire, constructed in accordance with this invention, comprises a carcass 10 surmounted by a tread portion 11 both of which are formed of suitable elastomeric material such as natural rubber, a copolymer of butadiene and styrene, other appropriate rubberlike substances, or blends thereof. The carcass 10 is reinforced by the usual spaced annular bead cores 12 and 13 each of which is formed of a plurality of convolutions of wire 14 which may be wrapped in known manner. The carcass 10 is further reinforced by one or more plies of cords 15 extending transversely of the carcass with the ends turned up around the bead cores. The ends of the ply cords 15 are retained in proper position and the beads further strengthened by reinforcing strips or flippers 16 and 17 placed externally of the ply cords. The bead regions of the carcass may also be provided with elastomeric filling strips to provide the desired configuration and the exterior of the beads may have finishing strips, such as 18 and 19, of conventional construction.

The tire carcass shown in Fig. 1 has the reinforcing cords 15 thereof in the form of multistrand wires which extend substantially radially of the carcass. Consequently, but a single ply of such cords is necessary for even large size tires such as the 10.00 x 20 size frequently employed on trucks. It will be understood, however, that more than one ply of carcass cords may be employed, if desired, and that these may be disposed at a slight angle relative to each other without departing from the general radial direction thereof. This construction provides a highly flexible carcass of great strength which will sustain high inflation pressures while preserving good cushioning action.

The flipper strips 16 and 17 likewise are preferably formed of multistrand wire disposed in parallel relationship and provided with an elastomeric coating, the cords of these strips being disposed at an acute angle relative to a radius of the tire. The finishing strips 18 and 19 are preferably textile fabric of the type commonly employed for like purpose in conventional tires.

The improved inextensible band or overhead 20 is provided between the tread and the carcass of the tire. It is formed of inextensible cord 21 extending diagonally from side to side of the band in what may be termed a zigzag configuration with a closed loop 22 at each change of direction of the cord. As will be seen in Fig. 3, this construction results in successive reaches of the cord extending in opposite directions with contiguous portions of the cords alternating between the upper and lower surface of the band in a manner such that the latter can be said to be multilayer. It will also be observed that the wire extends clockwise in the loops adjacent one edge of the band and counterclockwise in the loops adjacent the other edge. In the presently preferred construction, the angle which the successive reaches of the overhead cord make with the center line of the band is twenty-one degrees, but this angle may be varied within the range of from eighteen to twenty-five degrees without loss of the desired properties.

The presently preferred mode of constructing the overhead 20 is to employ a single continuous wire cord 21 which has been coated with an elastomer, such as uncured rubber, and is then wound upon a drum in multiple convolutions thereabout with the pitch, i.e. the space between successive like portions of the cord on the same side of the drum, being determined by the width of the overhead and the desired angle of the cord relative to the circumferential center line. It will be understood, of course, that the width of the overhead will be selected in accordance with the dimensions of the tire in which the band is to be employed. Preferably, the width of the band 20 is such that the loops 22 at the edges thereof are located adjacent the shoulders of the completed tire. By way of example, but without limitation thereto, a suitable overhead or band for a tire of the 10.00 x 20 size has a width of approximately six and one-half inches with the angle of the cords in the order of twenty-one degrees and with one hundred six loops 22 between successive like portions of the cord adjacent the same edge of the band.

The dimensions of the band are so selected that an integral number of pitch lengths thereof differs from the circumference by an amount such that successive convolutions of the wire 21 have portions in side-by-side, parallel, substantially contacting relationship with the loops 22 in overlapping relationship, the winding being continued until the band is, in effect, two layers thick at all locations. The completed band 20 is removed from the drum on which it is wound, the latter being formed in sections or in other known manner to facilitate this operation.

Figure 3:
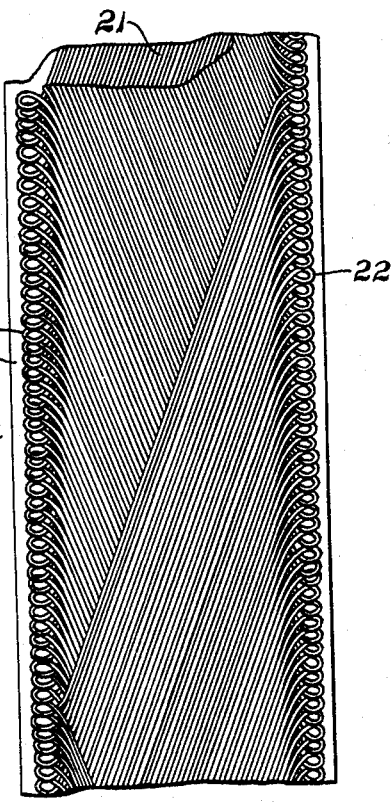
Fig. 3 is a fragmentary plan view of a flattened portion of the overhead shown in Fig. 2.
Figure 2:
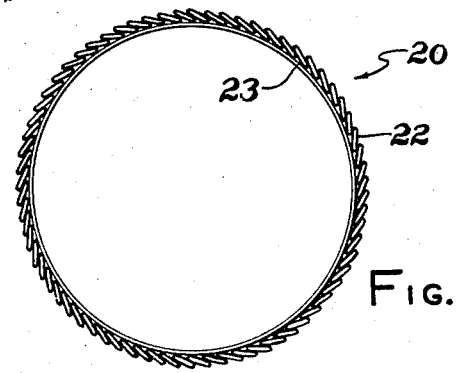
Fig. 2 is a side elevational view of the improved inextensible band or overhead employed in the tire shown in Fig. 1.

The band 20 is placed upon and in surrounding relationship to the carcass 10 which has been provided with bead cores and flipper strips and shaped to a substantially toroidal configuration in operations separate from the construction of the overhead. Preferably, one or more layers of elastomer, such as gum rubber, are placed between the carcass cords 15 and the overhead band 20 and this may be effected at the time the band is applied to the carcass. It is, however, presently preferable that a layer 23 of elastomer be placed upon the drum on which the overhead is wound before the winding operation is begun so that the completed band has the layer 23 of elastomer adhered thereto on the inner surface as indicated in Figs. 2 and 3 when the band is removed from the drum. This facilitates formation of the band and retention of the wire in proper position during handling. After the overhead or band 20 is assembled on the tire carcass, the tread and sidewall elastomer are applied and the tire is vulcanized in a suitable mold. Alternatively, the sidewall elastomer may be applied to the carcass before the band 20 is assembled thereon with the tread elastomer thereafter placed over the band.

The wire 21 employed in forming the overhead 20 is preferably multistrand and the individual filaments and/or strands from which it is formed may be disposed in any one of a number of different arrangements. Without limitation thereto, one suitable stranded wire has a filament diameter of 0.0058 inch and comprises a core of three wire filaments about which are twisted five strands, each comprising seven wire filaments, the strands being then wrapped with a single helically disposed filament. This wire cord is preferably coated with brass and the cord is provided with a coating of elastomer prior to winding the overhead, the elastomer coating being preferably provided by tubing uncured rubber about the wire. In the preferred construction, a single continuous wire cord is employed to form the entire overhead. It will be understood, however, that more than one wire cord my be employed, if desired.

The wire cords 15 utilized in the carcass may be like the wire cord 21 used in the overhead or may employ a different number and arrangement of wire filaments and strands depending upon the size of the tire and the physical properties desired therein. The carcass ply material is preferably formed by disposing a plurality of the wires 15 in closely adjacent parallel relationship and then calendering an elastomer thereon.

Figure 4:
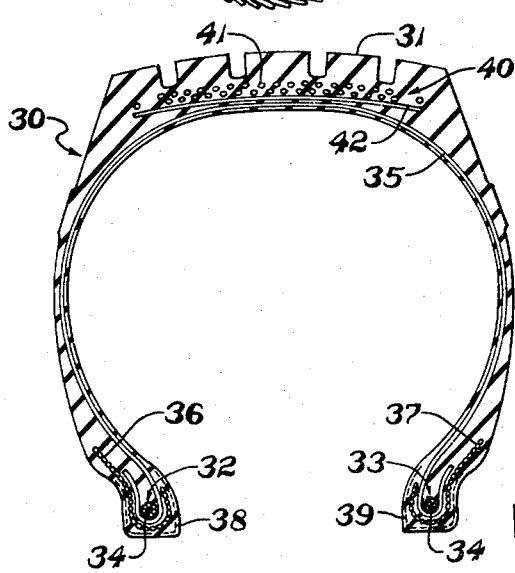
Fig. 4 is a view similar to Fig. 1, showing a modified construction in accordance with the invention.
Figure 5:
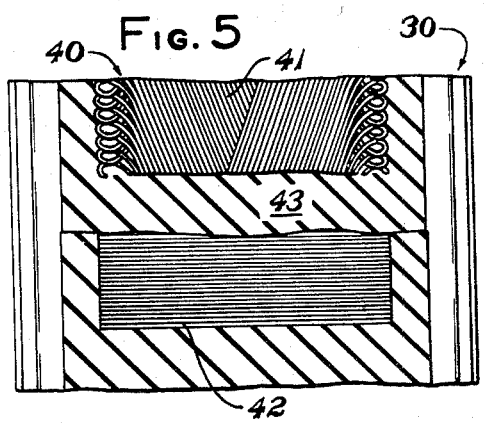
Fig. 5 is a fragmentary view of the tire shown in Fig. 4, as seen from the top thereof with the tread removed and with portions of the overhead broken at different locations to more clearly show the component parts.

Figs. 4 and 5 illustrate a modified tire construction incorporating the principles of this invention and which has greater rigidity of the tread region than that of a tire constructed as shown in Fig. 1. The tire illustrated in Fig. 4 comprises an elastomer carcass 30 surmounted by a tread portion 31. The inner edges of the carcass are reinforced by bead cores 32 and 33 formed of multiple convolutions of wire 34 which may be wrapped in known manner if desired. The carcass is reinforced by cords 35 which are preferably multiple strand wires extending substantially radially of the tire with the ends of the cords turned about the bead cores in the manner described for the tire shown in Fig. 1. Likewise, each bead of the tire beads are provided with reinforcing strips 36 and 37 externally of the carcass cords and the outer surfaces of the beads are provided with finishing strips 38 and 39 of the type described for like parts in the tire illustrated in Fig. 1.

The tire shown in Figs. 4 and 5 also comprises an annular band 40 preferably formed of a single inextensible cord 41 wound, as explained above for the inextensible band 20, to provide a zigzag configuration of the cord with closed, overlapping loops at the edges thereof as will now be readily understood. In addition to this annular band, the tire overhead includes a layer of parallel inextensible cords 42 arranged in side-by-side contacting relationship and extending transversely of the circumferential center line of the tire. Preferably, these cords 42 are disposed substantially at right angles to the center line although it will be apparent that they may extend at a slight angle thereto. The layer of cords 42 may be formed by calendering rubber upon a plurality of parallel cords and cutting the resulting material into a strip of desired width with the cords running transversely thereof. This strip may then be spliced into an annular band, in a manner which will be readily understood, and provided upon one side of the band 40 of zigzag wire 41 so that the wires 42 of the strip cooperate with the diagonally extending wire 41 of the band 40 to resist both transverse and lateral extensibility of the composite band.

A tire of the type as shown in Fig. 4 is constructed by forming the carcass 30 upon a suitable drum with the ends of the carcass cords 35 turned about the spaced bead cores 32 and 33 after which the strips 36 and 37 are applied. This band will then be shaped to substantially a toroidal configuration by an inflatable bladder or other means after which the strip of transversely extending cords 42 is applied thereover. Over this layer of cords is preferably placed a layer of gum rubber 43 and the annular band 40 is then positioned thereover in surrounding relationship thereto. If desired, the gum rubber 43 may be provided upon the interior of the annular band 40 as has been explained above in describing the construction of the band 20. Alternatively, the strip of cords 42 and the band 40, together with any intervening or covering layers of elastomer, may be assembled as a composite band and applied as a unit to the carcass. The sidewall elastomer may be applied before or after the placing of the overheads, tread elastomer is applied over the overheads, and the tire is cured in known manner.

The tire shown in Figs 4 and 5 exhibits the same properties, of flexible carcass and inextensible overhead with greatly reduced flexing of the tread rubber, as that exhibited by the tire illustrated in Fig. 1. The tire construction shown in Figs. 4 and 5 has, however, greater rigidity of the tread region than that of the tire shown in Fig. 1 since the transverse wires 42 in the overhead prevent any tendency of lateral expansion and contraction of the overhead band 40. Therefore, this tire will have improved cornering action and better tread wear while affording good cushioning action even with inflation pressures in excess of those customarily employed for conventional tires of like size.

Figs. 6 and 7 illustrate another tire construction incorporating the principles of this invention and which provides high lateral and circumferential rigidity in the tread region comparable to that achieved by the embodiment illustrated in Figs. 4 and 5. As shown in Fig. 6, the tire comprises an elastomeric carcass 50 surmounted by a tread portion 51 with the radial inner edges of the carcass reinforced by bead cores 52 and 53 formed of multiple convolutions of wire 54 which may be wrapped, if desired. The body of the carcass is reinforced by cords 55 which are preferably multistrand wires extending radially of the tire with the ends of the cords turned about the bead cores in the manner described for the tires shown in Figs. 1 and 4. Likewise, each bead of the tire is provided with a reinforcing strip 56 and 57 externally of the carcass cords and the outer surfaces of the beads are provided with finishing strips 58 and 59 of the type described for similar parts in the tires illustrated in Figs. 1 and 4.

The tire shown in Fig. 6 also comprises an annular band 60 preferably formed of a single inextensible cord 61 wound as explained above for the inextensible bands 20 and 40, except that the alternate reaches of the cord do not have the same angularity with respect to the circumferential center line of the band. Instead, the band 60 of this embodiment has the successive reaches of the inextensible cord 61 extending, respectively, at a comparatively low angle and at a high angle relative to the circumferential center line. For example, the low angle made by the reaches of the cord of greatest length may be in the order of 18-25° while the shorter reaches of the cord may be approximately at right angles relative to the said center line with a permissible variation in the order of plus or minus 15° from such right angle relationship. This configuration of the band may likewise be characterized as zigzag and has crossed overlapping loops at the edges thereof with the loops at one edge of the band extending in clockwise direction and those at the other edge in counterclockwise direction. As in the embodiment described with respect to Figs. 3 and 5, the band 60 may be formed upon a layer 62 of elastomer such as gum rubber or the like.

In constructing a tire in accordance with this embodiment of the invention, two annular bands are utilized, one of which has the inextensible cord 61 wound as shown in the upper portion of Fig. 7, while the second band 63 is similarly constructed but has the inextensible cord 64 thereof wound in the reverse sense as shown in the lower portion of Fig. 7. The band 63 like the band 60 preferably includes backing or supporting layer 65 of gum rubber or other elastomeric material. The bands 60 and 63 may be sequentially applied to the tire carcass 50 in superposed relationship upon a suitable building form or drum or the bands may be built in superposed relationship and applied as a composite or unitary band to the carcass. After the tire carcass has been provided with the overhead bands 60 and 63, the tire is completed by the application of the tread rubber and the tire is cured as will now be readily understood.

The tire shown in Fig. 6 may have either the band 60 or the band 63 placed adjacent the carcass and the other band placed over the first placed band with the tread superposed upon the last applied band. If desired, one or more strips of gum rubber or other elastomeric material may be provided between the tread and the uppermost overhead or band.

A still different embodiment of the invention is shown in Fig. 8. As illustrated therein, the tire comprises an elastomeric carcass 70 surmounted by a tread portion 71. This tire, like those previously described, is also provided with bead cores 72 and 73 and the carcass is reinforced by cords 74 which are preferably multistrand wires extending substantially radially of the tire as will now be apparent from the previously described embodiment. Likewise, the tire shown in Fig. 8 is preferably provided with reinforcing strips or flippers 75 and 76 disposed externally of the ply cords in the bead regions of the tire and the bases and outer faces of these bead regions may similarly be provided with finishing strips 77 and 78.

The tire shown in Fig. 8 also is provided with an annular band 80 preferably formed of a single inextensible cord 81 wound as explained above for the cord 61 in the band 60 shown in Fig. 7. The inextensible cord 81 is preferably multistrand wire coated with elastomeric material which is adhered to an underlying layer 82 of elastomer such as gum rubber or the like.

In addition to the band 80, the tire shown in Fig. 8 also includes a layer 83 of parallel inextensible cords 84 extending at an angle to the circumferential center line of the tire, which angle is preferably substantially the same in amount as that of the longer reaches of the cord 81 in band 80 but oppositely disposed. The layer 83 of cords 84 may be formed by calendering rubber upon a plurality of closely adjacent parallel cords and cutting and splicing the resulting material in a manner similar to that used in forming bias angle ply stock for tires of conventional construction. Such a strip may then be spliced into an annular band in a manner which will readily be understood and provided upon one side of the band 80 so that the wires 84 cooperate with the diagonally extending wire 81 of the band 80 to resist both transverse and lateral extensibility of the composite band. The layer 83 of parallel cords may be applied either between the carcass wires 74 of the tire and the band 80 or externally of the latter. The tire is completed by the addition of tread rubber and curing as has been previously explained for the other embodiments of the invention.

The band 80 and layer 83 of the embodiment of the invention illustrated in Figs. 8 and 9 may be formed as separate elements and separately applied to the tire carcass or, if desired, these two bands or layers may be sequentially built upon the same cylindrical surface and transferred as a unit to the tire carcass. The angularity of the parallel cords 84 need not be substantially the same as that of the longer reaches of the wire 81 but may be varied therefrom within wide limits so long as the cords 84 do not extend in substantially the same direction as either reach of the cord 81. Likewise, the wire 81 of the band 80 need not have its directions as shown in Fig. 9, but may be reversed therefrom, so as to have the configuration as shown in the lower part of Fig. 7, in which event the cords of layer 83 will be likewise reversed or have angularity such that they do not extend substantially parallel with either of the reaches of the wire 81 and the band 80.

Tires constructed as shown in Figs. 6 and 8 exhibit the same improved properties as those which have been described above for the tires shown in Figs. 1 and 4. Therefore, the recitation of the advantages flowing from the invention need not be again repeated. It should be additionally noted, however, that in this, as well as in the other embodiments of the invention, the improved overhead not only increases the tread wear but also prevents penetration of objects, such as nails or the like, and protects the carcass cords from injury by impact caused by striking objects or severe bumps in the road.

The invention has been described with emphasis upon its incorporation in tires of larger sizes such as those utilized on trucks and buses. It will be understood, however, that like principles may be incorporated in smaller tires including those intended for passenger vehicles. It will also be apparent that, although the illustrated embodiments of the invention show tires having only a single ply of radially extending carcass reinforcing wire cords, two or more plies of carcass cords of wire or of textile fibers may be employed and these disposed at a low angle relative to each other. The angularity of the carcass cords, measured relative to the longitudinal center line of the tire, preferably should not, however, vary from ninety degrees by an amount in excess of plus or minus ten degrees. These and other modifications and adaptations of the invention, which will readily occur to those skilled in the art, are considered as within the ambit of the invention, the scope of which is defined by the appended claims.

Having thus described the invention, I claim:

1. An inflatable vehicle tire comprising a carcass surmounted by a tread with an overhead between the carcass and tread, the said overhead comprising inextensible cord extending angularly back and forth across the circumferential center line of the tire with the cord crossing itself in a closed loop at the location of each change of direction of the cord.

2. An inflatable vehicle tire comprising a carcass surmounted by a tread with an overhead between the carcass and tread, the said overhead comprising a layer of substantially parallel wire cords extending angularly relative to the center line of the tire and a continuous wire cord extending angularly back and forth across the said circumferential center line with the continuous cord crossing itself in a closed loop at the location of each change of its direction.

3. An inflatable vehicle tire as defined in claim 2 wherein the said loops are positioned in overlapping relationship adjacent the shoulders of the tread.

4. An inflatable vehicle tire comprising a carcass surmounted by a tread with an overhead between the carcass and tread, the said overhead comprising a wire cord extending angularly back and forth across the circumferential center line of the tire in two layers with the cord crossing itself in a closed loop at the location of each change of its direction, the said loops being alternately of clockwise and counterclockwise configuration, the said loops being disposed in overlapping relationship and oppositely directed reaches of the cord having portions alternately in different layers.

5. An inflatable vehicle tire comprising a carcass surmounted by a tread with an overhead between the carcass and tread comprising wire cord extending diagonally back and forth across the circumferential center line of the tire in multiple convolutions with the cord crossing itself in a closed loop at the location of each change of direction of the cord and with each successive convolution of the cord having portions closely adjacent and substantially parallel to portions of the previous convolution in the same portion of the tire.

6. An inflatable vehicle tire comprising a carcass surmounted by a tread with an overhead between the carcass and tread, the said overhead comprising a wire cord extending diagonally back and forth across the circumferential center line of the tire in two layers with the cord crossing itself in a closed loop at each change of direction of the cord which loops are located adjacent the shoulders of the tread, successive portions of the oppositely directed reaches of the cord being disposed alternately in different layers and successive convolutions of the cord having portions closely adjacent and substantially parallel to portions of the previous convolution in the same portion of the tire.

7. An inflatable vehicle tire as defined in claim 6 and further comprising an overhead layer of substantially parallel wire cords extending transversely relative to the center line of the tire and at an angle relative to said diagonally extending cord.

8. A pneumatic tire comprising an elastomer carcass reinforced by a pair of spaced bead cores and a ply of wire cords extending substantially radially of the carcass, an elastomer tread surrounding said carcass, and an overhead between said carcass and tread comprising an annular band formed of wire cord disposed in zigzag configuration with the latter cord crossing itself in a closed loop at each change of direction and with the loops located at the opposite edges of the overhead.

9. A pneumatic tire as defined in claim 8 and further comprising an overhead layer of substantially parallel wire cords with the last-mentioned cords extending at an angle relative to the circumferential center line of the tire.

10. An inflatable vehicle tire comprising a carcass surmounted by a tread with an overhead between the carcass and tread, the said overhead comprising a continuous wire cord extending angularly back and forth across the circumferential center line of the tire in two layers, the said cord crossing itself in a closed loop at each change of direction of the cord which loops are located adjacent the shoulders of the tread, immediately successive portions of the oppositely directed reaches of the cord being disposed alternately in different layers and at different angles, successive convolutions of the cord having portions closely adjacent and substantially parallel to portions of the previous convolution in the same portion of the tire.

11. An inflatable vehicle tire as defined in claim 10 and further comprising an overhead layer of substantially parallel wire cords extending angularly relative to the center line of the tire and at an angle relative to said continuous cord.

12. An inflatable vehicle tire comprising a carcass surmounted by a tread with an overhead between the carcass and tread, the said overhead comprising two annular bands each formed by a wire cord extending angularly back and forth across the circumferential center line of the tire in two layers with the cord crossing itself in a closed loop at each change of direction of the cord which loops are located adjacent the shoulders of the tread, successive portions of the oppositely directed reaches of the cord in each band being disposed alternately in different layers with successive convolutions of that cord having portions closely adjacent and substantially parallel to portions of the previous convolution in the same portion of the tire, the angularly extending portions of one band being reversely disposed relative to the angularly extending portions of the other band.

References Cited in the file of this patent

UNITED STATES PATENTS 2,059,764    Zerillo _____ Nov. 3, 1936

FOREIGN PATENTS 15,061    Great Britain _____ of 1899
513,800    Italy _____ Feb. 7, 1955
   (Corresponding English language patent Great Britain 780,765, Aug. 7, 1957)
779,159    Great Britain _____ July 17, 1957